(12) United States Patent
Hassen

(10) Patent No.: US 12,561,720 B1
(45) Date of Patent: Feb. 24, 2026

(54) CRYPTOGRAPHICALLY ATTESTED, CONTINUOUSLY SELF LEARNING IMPACT RATING SYSTEM FOR CHARITABLE ORGANIZATIONS

(71) Applicant: David Hassen, Vernon Hills, IL (US)

(72) Inventor: David Hassen, Vernon Hills, IL (US)

( * ) Notice: Subject to any disclaimer, the term of this patent is extended or adjusted under 35 U.S.C. 154(b) by 0 days.

(21) Appl. No.: 19/250,883

(22) Filed: Jun. 26, 2025

Related U.S. Application Data

(63) Continuation-in-part of application No. 18/110,049, filed on Feb. 15, 2023.

(60) Provisional application No. 63/436,080, filed on Dec. 29, 2022.

(51) Int. Cl.
    *G06Q 30/0279*     (2023.01)
    *H04L 9/32*     (2006.01)

(52) U.S. Cl.
    CPC ....... *G06Q 30/0279* (2013.01); *H04L 9/3221* (2013.01); *H04L 9/3239* (2013.01)

(58) Field of Classification Search
    CPC .. G06Q 30/0279; H04L 9/3221; H04L 9/3239
    See application file for complete search history.

(56) References Cited

U.S. PATENT DOCUMENTS

| | | |
|---|---|---|
| 7,014,104 B2 | 3/2006 | MacFarlane et al. |
| 2002/0038225 A1 | 3/2002 | Klasky et al. |

| | | |
|---|---|---|
| 2005/0021353 A1 | 1/2005 | Aviles et al. |
| 2008/0048026 A1 | 2/2008 | Gangi |
| 2011/0054986 A1 | 3/2011 | Rubin et al. |
| 2012/0197707 A1 | 8/2012 | Chagan et al. |
| 2018/0075393 A1* | 3/2018 | Lovell ................ G06Q 30/0267 |

FOREIGN PATENT DOCUMENTS

WO    WO-2021188040 A1 * 9/2021 ........... G06Q 20/384

OTHER PUBLICATIONS

"Using blockchain and AI for assessing a charity's impact", Charities Management, No. 123 Late Autumn 2018 (Year: 2018).*

* cited by examiner

*Primary Examiner* — Rehana Perveen
*Assistant Examiner* — Troy A Maust
(74) *Attorney, Agent, or Firm* — Donald J Ersler

(57) ABSTRACT

A cryptographically attested, continuously self-learning system rates the present and predicted impact of nonprofit organizations. A ZKP verifier authenticates private operational metrics. A causal-graph module and neuro-symbolic engine compute present-day causal-impact and strategic-integrity scores. A Bayesian forecasting engine and Monte-Carlo simulator generate an Impact-Predictability Index. Ratings are hashed and written to a permissioned ledger, and smart contracts release donor funds only when objective thresholds are met. Continuous-learning, federated-privacy, and financial-resilience subsystems ensure robust, tamper-evident evaluation and funding.

20 Claims, 10 Drawing Sheets

1

CRYPTOGRAPHICALLY ATTESTED, CONTINUOUSLY SELF LEARNING IMPACT RATING SYSTEM FOR CHARITABLE ORGANIZATIONS

BACKGROUND OF THE INVENTION

1. Cross-References to Related Applications

This is a continuation-in-part patent application, which takes priority from patent application Ser. No. 18/110,049, filed on Feb. 15, 2023, which claims the benefit of patent application No. 63/436,080, filed on Dec. 30, 2022, the above patent applications are hereby incorporated by reference in their entirety.

2. Field of the Invention

The present invention relates generally to donating and more specifically to a matching gifts and impact tracking process utilizing artificial intelligence, which provides a more efficient method of processing matching gifts and rating charities. Additionally, the present invention relates generally to automated evaluation of nonprofit and charitable organizations, and more particularly to cryptographically attested, continuously self-learning systems and methods that generate present-day and predictive impact ratings using artificial intelligence, causal inference, and permissioned ledger technologies.

3. Discussion of the Prior Art

Many charities have web pages that accept donations online and offline. They sometime include an option to include a company matching gift. However, the process puts the onus on the donor to take the receipt that is generated from the donation and
manually file it on their respective company system following each company's matching gift processing procedures. Many donors, give up and never continue the filing process. Or if they file, the employee matching gift request might get declined for missing required information. Or if the matching gift is approved, but sometimes the funds never make it back to the charity or it may
go into an old bank account for the charity (as charities have to maintain a separate remittance account with each company). Or the charity gets the matching gifts funds from the company but
don't know how to properly link it the original donor for lack of key information on the financial payment which is time consuming for the limited charity staff to track and research.

In addition, many companies and donors today, are becoming more concerned with where the funds (matching gifts, grants, and general donations) are going and the impact of those donations on the non-profit. There is no real-time and transparent process for tracking where each donation dollar goes once it reaches the non-profit.

Prior art charity databases contain limited manually vetted organizations. Charities provide some information. An army of reviewers are typically used to review each charity for rating (on subjective, based on rater feelings), and completed once infrequently. Donors have limited resources to research each charity and any changes that may occur. The analysis of the charities is not done in real time.

Company donors are limited in using limited criteria in evaluating the approval of the donations and matching gifts. The reason company donors rely on humans for evaluations is they also require additional criteria that is not available in prior art, like risk of donating to a bad or terrorist organization, negative publicities, or other reasons. Company donors have to manually check each donation against past records or history which
is time consuming. Scoring is typically static and one off. Donors donate to a charity and funds are deposited into their bank account or sent as a check to be deposited into the charity bank account. However, charities change banks all the time. Charities also change staff all the time. Over 45% of donations go missing or into wrong bank accounts, because donors don't have the latest banking information. There is a high chance of banking fraud and hacked bank accounts, because charities provide the banking financial info to numerous donors and third parties. Granting matching funds requires manually reviewing each request to verify risks and other issues, that are not available with simple conditions, such as maximum amount, charity type and the like.

Patent publication no. 2002/0038225 to Klasky et al. discloses a method and system for matching donations. Patent publication no. 2005/0021353 to Aviles et al. discloses a donation system and method. U.S. Pat. No. 7,014, 104 to MacFarlane et al. discloses a gift matching method. Patent publication no. 2008/0048026 to Gangi discloses a system for associating identification and personal data for multiple magnetic strip cards or other sources to facilitate a transaction and related methods. Patent publication no. 2011/0054986 to Rubin et al. discloses a donation facilitator social network. Patent publication no. 2012/0197707 to Cohagan et al. discloses a loyalty points system and method with supplemental authorizations.

Corporations, foundations, and individual donors increasingly demand objective, real-time evidence of impact before releasing funds to nonprofit organizations. Traditional rating services rely on static financial ratios and human curation, which cannot capture nuanced program outcomes or rapidly evolving operational risks. While our parent application discloses using artificial intelligence to rate charities across multiple factors and retrain the model with new data, there remains a need for: (i) verifiable provenance of private data supplied by nonprofits; (ii) causal-impact measurement rather than correlation-based scoring; (iii) predictive analytics that quantify uncertainty; and (iv) tamper-evident storage of rating outputs that can automate conditional fund disbursement.

Accordingly, there is a clearly felt need in the art for a matching gifts and impact tracking process utilizing artificial intelligence, which provides a more efficient method of processing matching gifts and rating charities to increase the amount
matching gifts that a charity will receive.

SUMMARY OF THE INVENTION

The present invention provides a matching gifts, donations and impact tracking process utilizing artificial intelligence, which provides a more efficient method of processing matching gifts and rating charities. Additionally, the present invention provides a hardware-accelerated cryptographic attestation layer, causal-inference and neuro-symbolic modules, a predictive Impact-Predictability Engine, continuous-learning optimization, and a permissioned distributed-ledger component linked to programmable smart-contract fund releases. Collectively, these enhancements provide donors with machine-verifiable confidence that (1) private operational claims are true, (2) present-day ratings isolate causal impact, (3) future impact is probabilistically forecast, and (4) disbursements occur only when objective thresholds are achieved.

A charity database utilizing an Artificial Intelligence (AI) engine, are continuously reviewed and rated against each other, objectively and without bias. The AI engine continuously pulls, polls and searches any information from outside sources for the charities in the database. Unlimited evaluation criteria is used by the AI engine and will develop its own parameters for evaluation and rating. The evaluation process continues into funding the charity by requiring the charity to provide details for accessing the funds from their funds escrow.

The AI engine will continue analyzing the charity, and its performance
quality. The AI engine will raise an alert if there is a discrepancy, or if a red flag raised. The charity is encouraged and evaluated on providing more details on their programs and impact.

In addition to the standard basic criteria, company donors can evaluate the charity on other parameters that are polled from different sources and processed in real-time, including risks, terrorist activities and negative PR. The AI engine incorporates the history in building the scoring model for the company donor. The AI engine will continue learning new requirements and criteria based on real-time information, to generate the most up to date scoring of a particular charity. Donors are provided a funding account to make financial deposits into for all charities on the program. A unique identifier identifies each deposit batch.
The AI engine tracks the batch to the donation and provides tracking to the charity. Charities are able to withdraw from the account as needed. Charities provide information on the usage of the funds to update the AI engine with the latest impact information, which is available to donors.

Donors might also limit how the funds are used based on various criteria. Donors might also request that funds are only disbursed and paid on valid vendor invoices. The AI engine will evaluate the spend per charity compared to other charities and use the information for the rating/scoring as needed. Each request receives a score of potential issues. The donor can approve the whole batch and generate a batch for payment tracking, or allow the system to auto-approve a batch based on score threshold (I.e. Score >90%). A percentage below the Score would require a manual review or rejection.

Another key difference of utilizing artificial intelligence in the review process, is that the AI can continuously learn and will be able to make better future recommendations and decisions. A further key difference of utilizing AI is that all decisions and scoring is unbiased compared with the pure human evaluation process. This is very important when attempting to eliminate discrimination in the decision-making process. A final key difference with utilizing the AI engine, is that the AI engine will be able to recommend donations to charities that have greater impact from the donation based on the integrated feedback loop and continuous internal or external feeds.

Accordingly, it is an object of the present invention to provide a matching gifts, donations and impact tracking process utilizing artificial intelligence, which provides a more efficient method of processing matching gifts.

It is another object of the present invention to provide a matching gifts, donations and impact tracking process utilizing artificial intelligence, which eliminates having manually fill out forms.

Finally, it is another object of the present invention to provide a matching gifts, donations and impact tracking process utilizing artificial intelligence, which provides a rating of charities to increase the amount matching gifts that a charity will receive.

These and additional objects, advantages, features and benefits of the present invention will become apparent from the following specification.

DETAILED DESCRIPTION OF THE PREFERRED EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method descriptions may be executed in any order and are not limited to the order presented.

The invention is preferably a Cloud-based system that utilizes cloud based technologies including redundant hardware, operating systems, databases, and other technologies to enable cloud-based computing.

Figure 1:
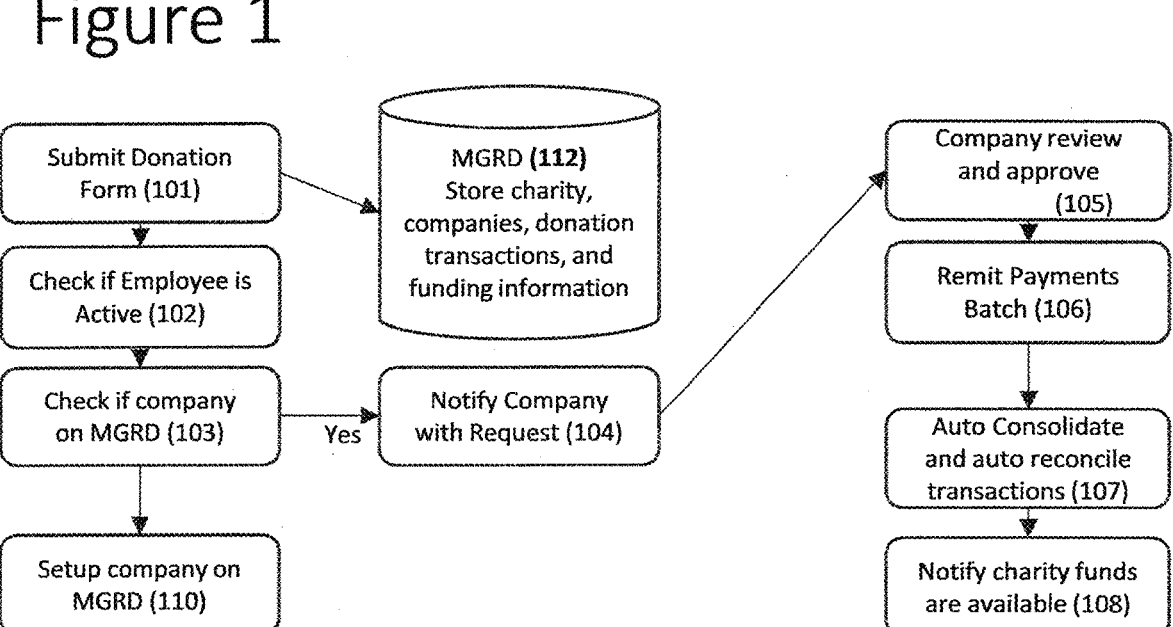
FIG. 1 is a flow chart of an automated matching gift process of a matching gifts, donations and impact tracking process utilizing artificial intelligence in accordance with the present invention.

With reference to FIG. 1, an automated matching gift process of a matching gifts and impact tracking process (gift system) provides donors with the ability to make a donation online on a charity website. A user is provided an option to include their company email address. The gift system will send a unique verification code to a donor email address and ask the donor to enter information on an electronic donation form in block 101. The donation is preferably entered through an electronic device, such as a smart phone, a computer, iPad or any other suitable device. The donation entry would be preferably made to a website or any other suitable software portal. Verification that the employee is an active employee with the company is made in block 102. However, other methods may be utilized to verify the employee. A filled electronic donation form 101 is sent to a matching gifts registry database (MGRD) in block 112. The MGRD 112 includes charities, companies, donations, transactions and funding information. Once validated, the donor can proceed with completing their donation and get a receipt, which will be the extent of the donor involvement in getting a matching gift requested. From this point on, the gift system will lookup the company to check if they are already on the Matching Gift Registry Database (MGRD) 103, if not the company will have to be setup on the MGRD in block 110. If the company is already setup and active, and the donations meets the company pre-established criteria for a matching gift, the gift system will send an email notification 104 to the company Matching Gift Representative (MGR), informing them that there is a new request in their Queue for processing.

On a monthly basis or as needed, the MGR, can review all the pending requests for the company, make any adjustments needed, approve, or decline the pending requests in block 105, and then process the batch in block 106. Next, the transactions will be auto consolidated and reconciled in block 107. Finally, the charity will be notified that funds are available in block 108. The gift system can also be configured using artificial intelligence (AI) tools to handle the review of the requests to meet the company matching gifts criteria. In that case, the MGR can opt to simply approve all requests passing the AI review, and process the batch. The batch may include one or many different requests from one or many non-profit organizations. The batch will include a Unique Payment Code, that the MGR will use to remit the total batch payment as one lump sum to a pre-established banking account for deposit with the unique code to simplify tracking of the payment. The MGR may also pay via credit card or any other preferred payment method available.

Once the funds are received, the system will automatically credit the funds and link it the original donation and donor, without the need for any manual processing. This process is estimated to save hundreds of hours for each company, donor, and charity on a monthly basis. It guarantees that needed funding is actually received by the non-profits, instead of disappearing and not being able to trace as currently is the case in the manual and archaic process. In the case that the company is not setup on the MGRD, the system administrators will coordinate the setup of the company on the database in block 110.

Alternatively, a company may setup a matching gift donation form or campaign for one specific organization or multiple charities, or allow the employee to pick their own charity. For charities on the MGRD, the employee will be able to pick the specific campaign, appeal, fund and designation for those charities. Once the employee makes their donation via credit card, payroll deduction or other methods, the matching gift process will follow the steps outlined in FIG. 1 to get approval from the MGR and batch the donations. The system will handle the disbursement of the funds automatically to the respective charities. A donor may use conditional remittances, where additional information is required to make the gift or donation.

Figure 2:
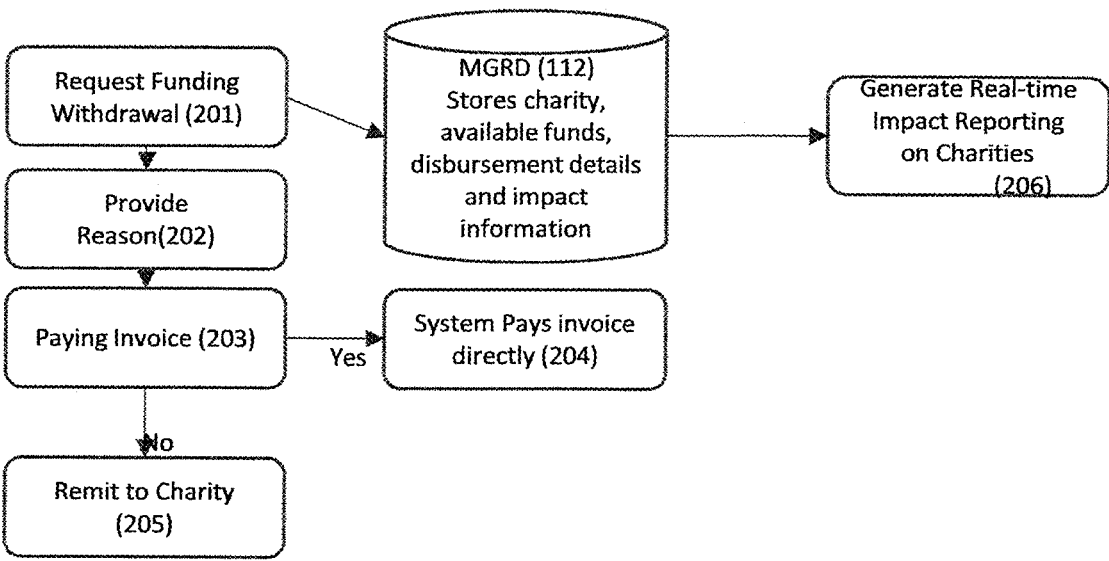
FIG. 2 is a flow chart of an impact tracking process of a matching gifts, donations and impact tracking process utilizing artificial intelligence in accordance with the present invention.

With reference to FIG. 2, the gift system will request (when enabled) from the non-profit to provide a funds withdrawal in block 201 and provide a reason and documentation in block 202 to get access to the funds from the Donation Funds Escrow (DFE) available to them. The request funding withdrawal in block 201 is sent to the MGRD in block 112. With this process, when a charity requires withdraw of funds for any reason from their DFE, they would include a brief explanation, and pick a universal categorization of the use of the funds to be disbursed. Another alternative, they may attach an invoice for services (i.e. food delivery) in block 203, then the system will disburse the funds directly to that vendor in block 204 or to the charity in block 205. That information will be available to donors and companies, to get a real-time understanding of where the funds are being directed to. The new process will provide for greater transparency that is currently lacking in charitable contributions. This invention is not intended to add more work on the non-profits, but simply to provide donors that support charities with visibility to where each dollar goes within a non-profit and to build greater confidence with the impact from those donations, and to help continue supporting the charity on a long-term basis. The MGRD in block 112 will generate real-time impact reporting on charities in block 206.

Organizations including non-profits and charities, might opt to setup a Smart Deposit Account (SDA), that would allow any donor to make deposits into. The SDA will not allow debiting the account, to eliminate any fraudulent transactions, and would eliminate the need for organizations to provide their real banking information to a multitude of potential donors and payors, thus reducing the risk of outdated information and risk of fraud. The SDA will be a permanent account for the organization and independent of the current banking financial institution servicing the organization financial needs. The SDA is the one account to receive any funding for the respective organization. Payors and Donors will be required to provide detailed information on the deposit or funding including but not limited to who is making the transaction, and if there are any sub-entities linked to the deposit (i.e. employee donations for example). The above goes beyond today's banking registry and ledgers that provide just the payor name which is not sufficient and very cumbersome in reconciling financial transactions to determine who paid what amount for what item.

Figure 3:
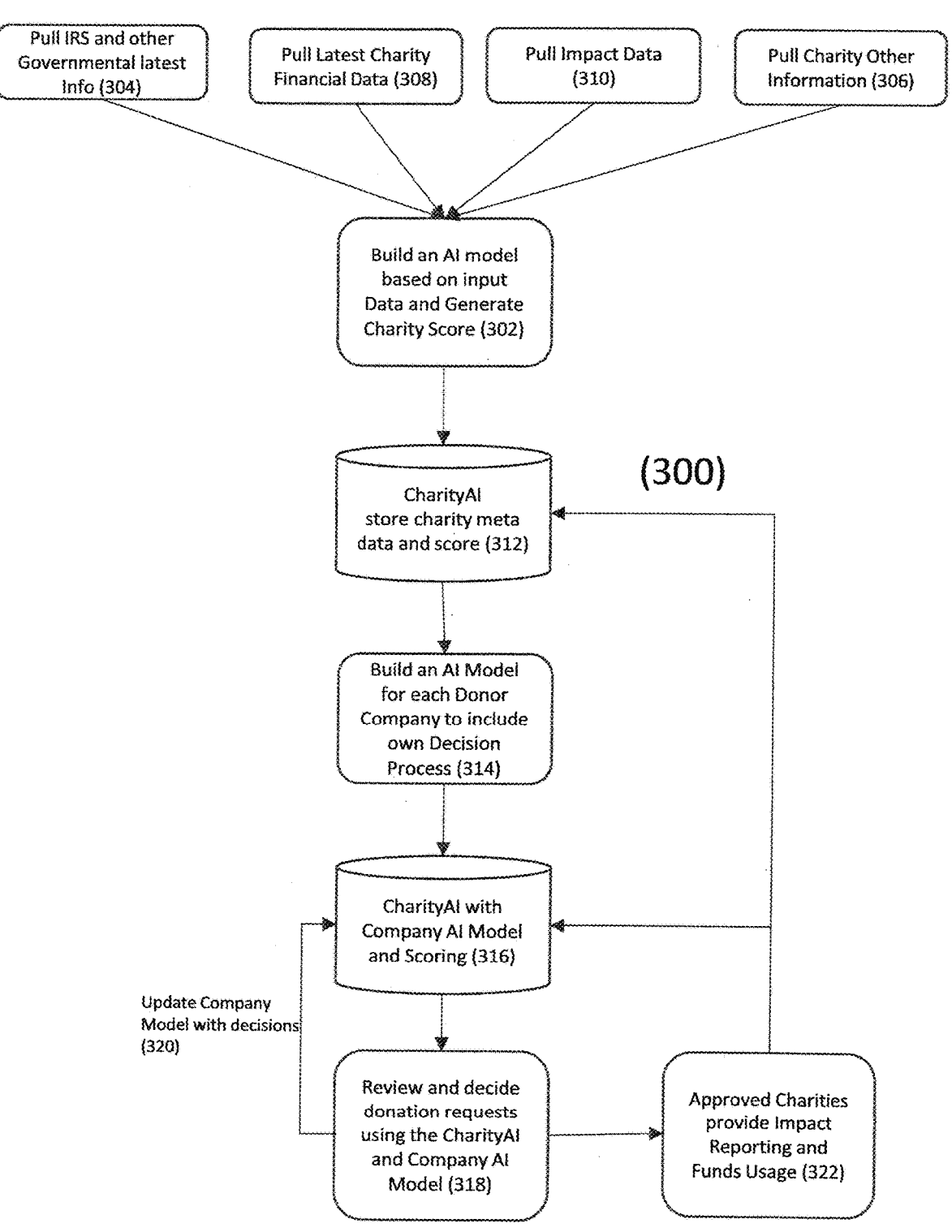
FIG. 3 is a flow chart of a charity AI review process of a matching gifts, donations and impact tracking process utilizing artificial intelligence in accordance with the present invention.

With reference to FIG. 3, when donors (public or employees of a company) want to donate to any charity, a flow chart 300 illustrates the gift system, which includes an artificial intelligence (AI) Machine Learning (ML) (or Deep learning) model, which takes into account multiple factors. An AI model is built in block 302, which receives multiple inputs. Organization Compliance with Governmental Procedures (i.e. appropriate IRS filing) in block 304 is input to block 302. No criminal records or watch alerts in block 306 are input into block 302. Financials available and health based on different factors in block 308 are input into block 302. No negative news and publicities are also considered. Strong leadership team, positive public perception, volunteers feedback and discrimination policies are further factors in the AI review of a charity. Impact from the donations in block 310 are input into block 302. Charity meta data is stored in block 312. A model is created in the AI engine for evaluating each charity in block 314. Historical data on all charities is run through the model to train it. The AI engine, is then used to Score over 2,000,000 nonprofits based on the various factors used above in block 316. The AI engine will be trained continuously (retrained/self-learning) with new data input to improve it's scoring mechanism to provide more accurate Score on each charity/organization. Donation requests are decided using charity AI and a company AI model in block 318. If the donation request is rejected in block 318, flow goes to block 320 to update the company model and back to block 316. If the donation is approved, flow goes to block 322, which provides impact reporting and funds usage. Block 316 and block 312 is updated with new information from block 322.

When a donor, is ready to donate to a charity, they are able to set their search criteria to the type of organization they wish to support (based on existing charity categorization NTEE), or pick an organization that is near and dear to them. Once selected, the AI engine provides the Score to the list of organizations that match the donors criteria. The donor may opt to continue and donate to the charity that meets their personal threshold. When a donation is made, the AI engine will learn from the donation process, and also inform the donor of the chances of the donation being matched by their employer based on the Employers own AI Model (below). The employee will know up front if their donation will be matched or not based on the Employer Match Model.

Figure 4:
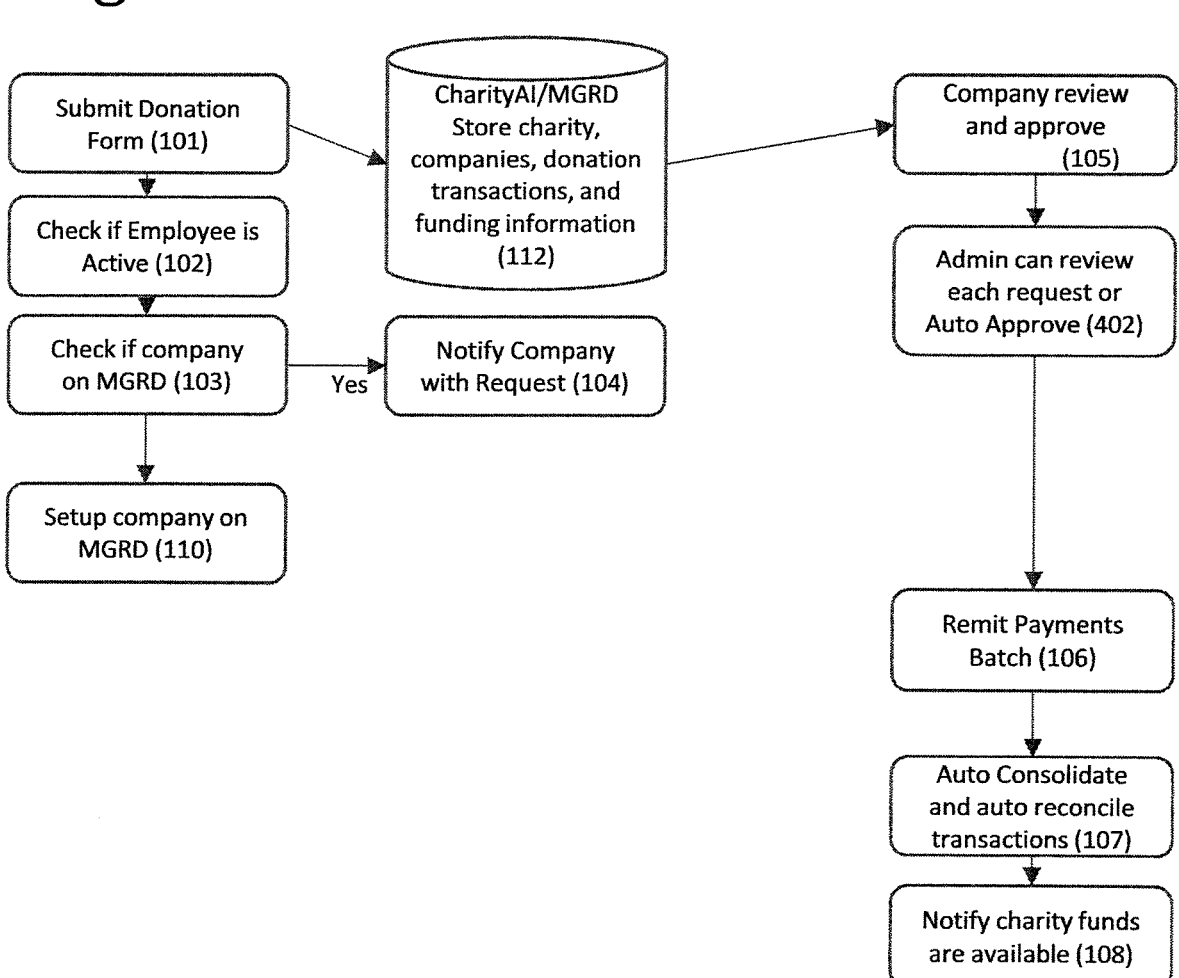
FIG. 4 is a flow chart of a matching gifts review process of a matching gifts, donations and impact tracking process utilizing artificial intelligence in accordance with the present invention.
Figure 5:
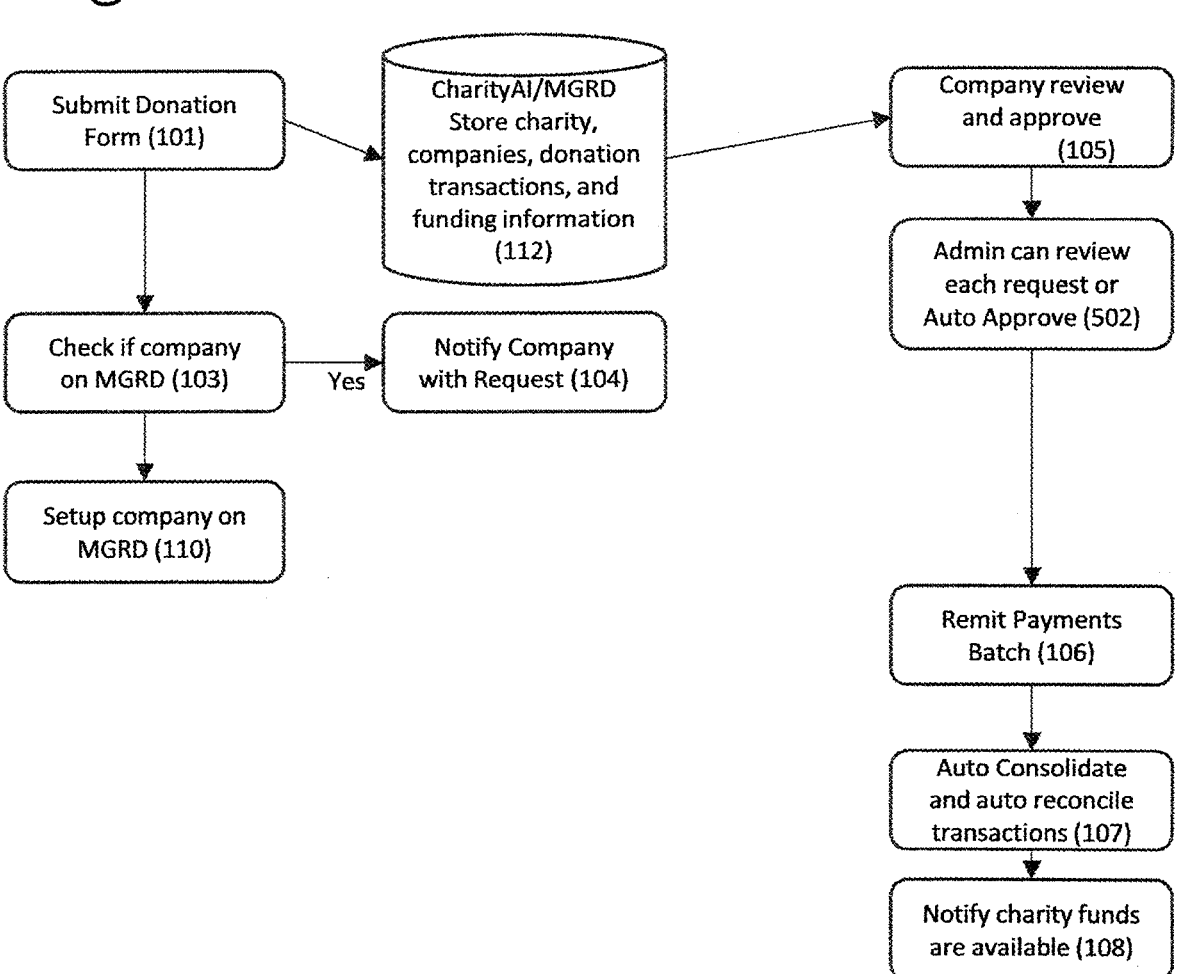
FIG. 5 is a flow chart of a grant donations review process of a matching gifts, donations and impact tracking process utilizing artificial intelligence in accordance with the present invention.
Figure 6:
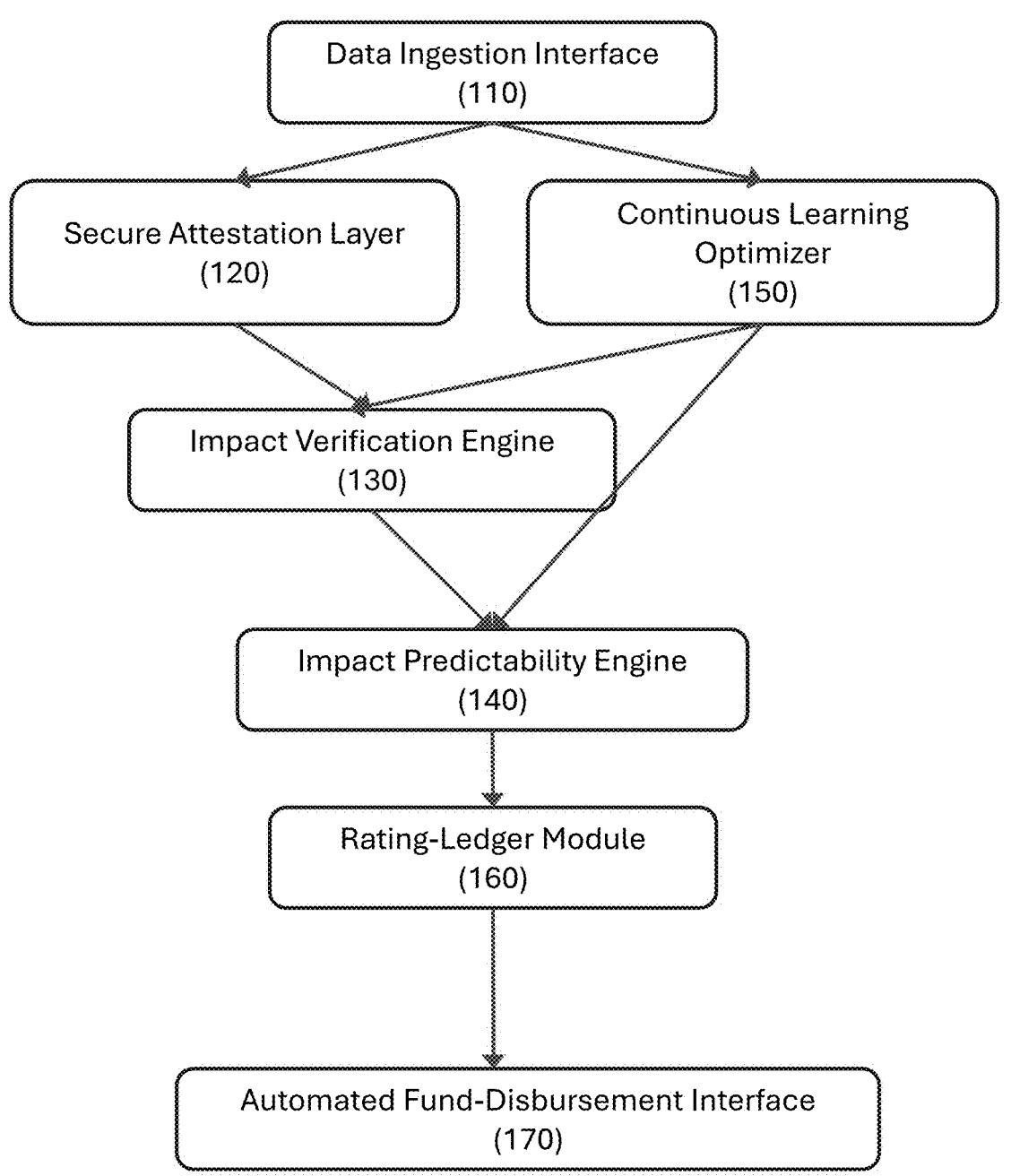
FIG. 6 is a flow chart of System-Level Architecture. A charity-facing Data-Ingestion Interface (110) feeds a Secure-Attestation Layer (120), an Impact-Verification Engine (130), an Impact-Predictability Engine (140), a ontinuous-Learning Optimizer (150), a Rating-Ledger Module (160), and an Automated Fund-Disbursement Interface (170). Solid arrows show primary data flow; dashed arrows show model-update feedback from Optimizer 150 to Engines 130/140.
Figure 7:
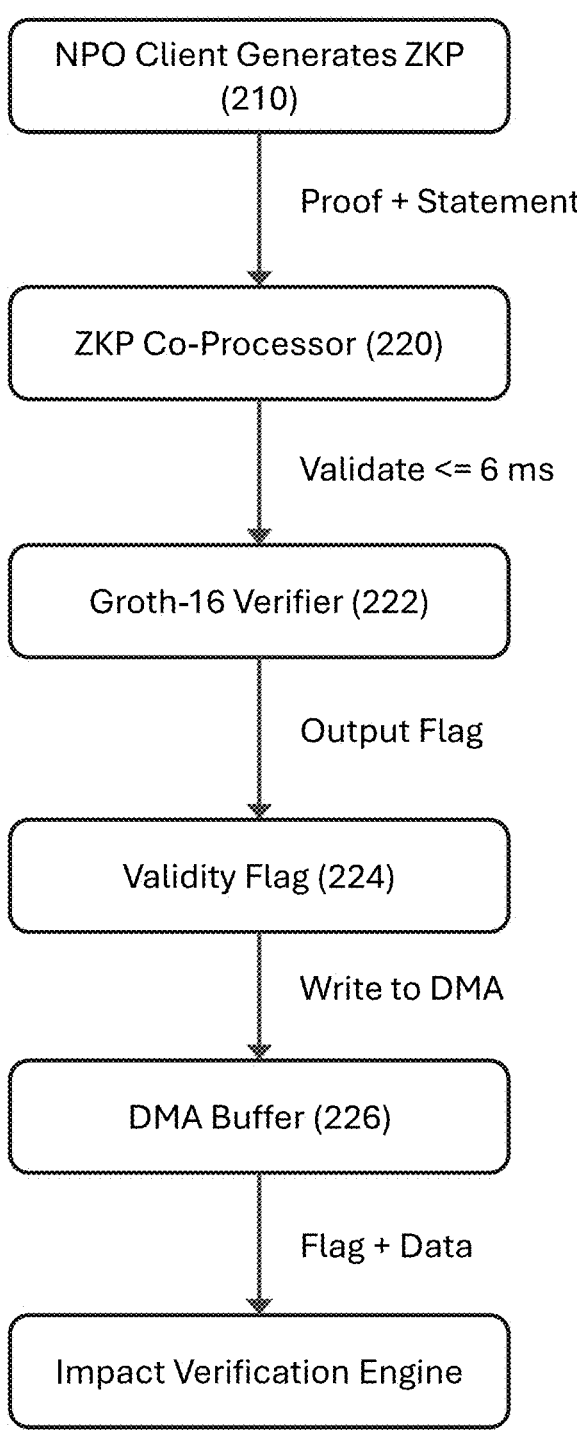
FIG. 7 is a flow chart of a Secure-Attestation Workflow (sequence diagram). Step 1: an NPO client generates a Zero-Knowledge Proof (210) about a private metric. Step 2: the proof and public statement are transmitted to the ZKP Co-Processor (220). Step 3: the Groth-16 Verifier (222) validates the proof within ≤6 ms and writes a Validity Flag (224) to a DMA Buffer (226) shared with the GPU cluster. Step 4: the flag and attested data are forwarded to the Impact-Verification Engine.
Figure 8:
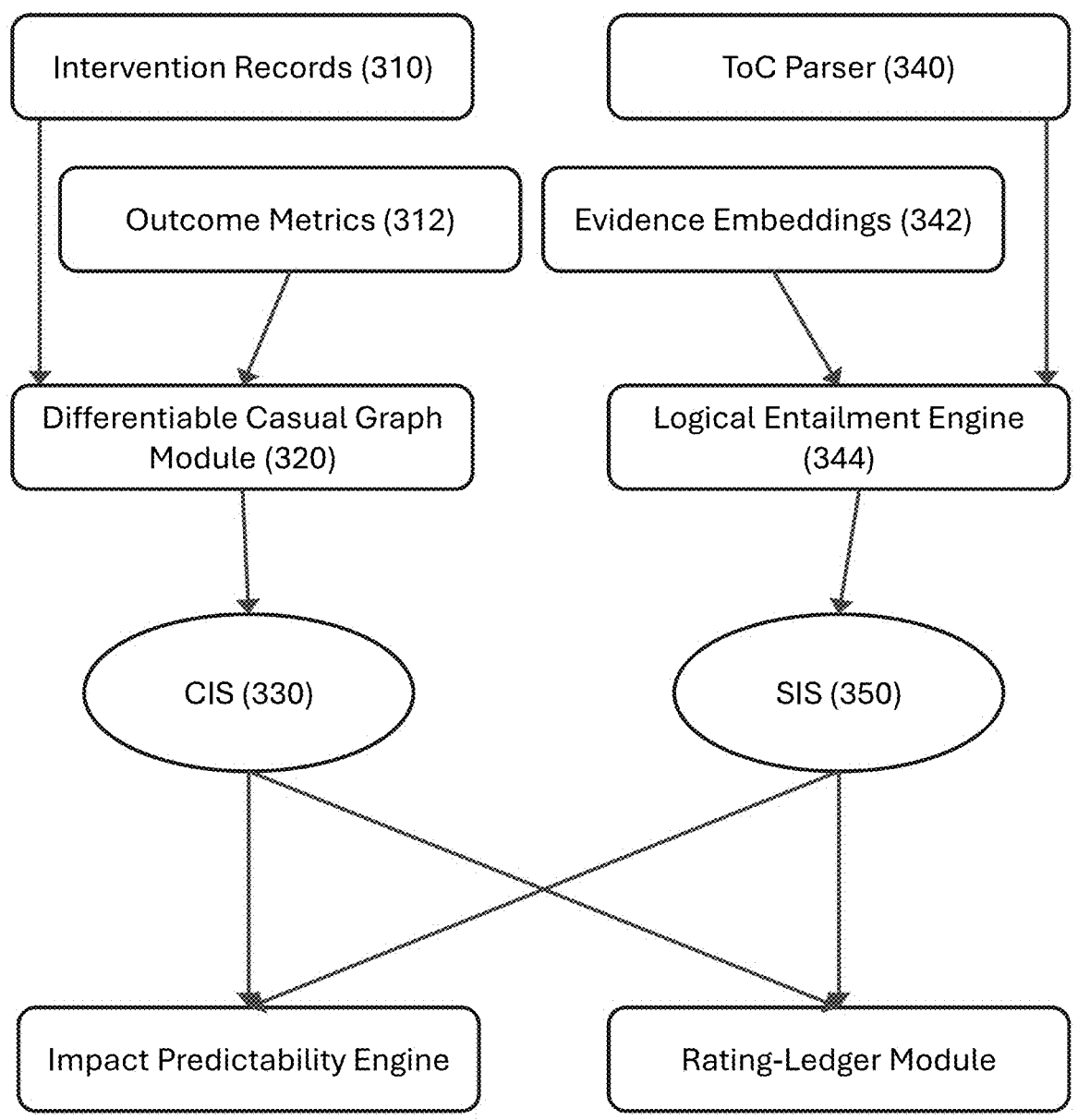
FIG. 8 is a flow chart of a Causal-Graph and Neuro-Symbolic Data Flow (data-flow diagram). Incoming Intervention Records (310) and Outcome Metrics (312) enter a Differentiable Causal-Graph Module (320) to compute a Causal-Impact Score (CIS 330). In parallel, a Theory-of-Change Parser (340) converts the organization's strategy into symbolic predicates, which combine with Evidence Embeddings (342) inside a Logical Entailment Engine (344) to output a Strategic-Integrity Score (SIS 350). Both CIS 330 and SIS 350 feed the Impact-Predictability Engine and Rating-Ledger Module.
Figure 9:
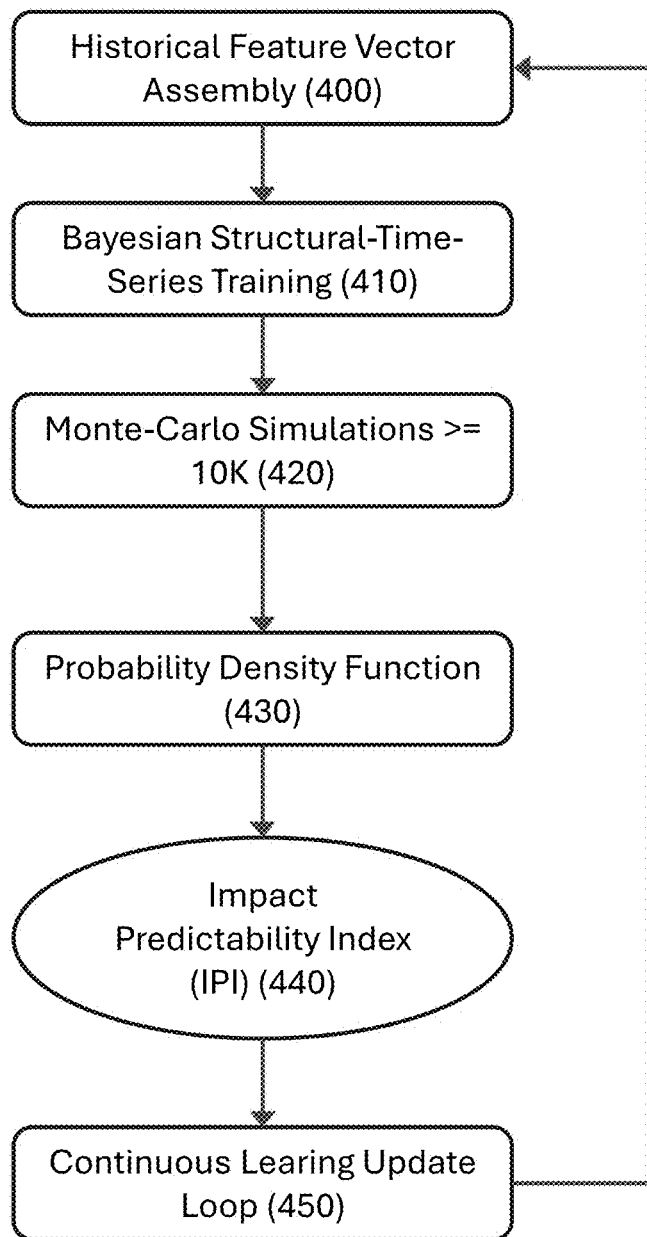
FIG. 9 is a flow chart of a Monte-Carlo Forecasting Pipeline (flowchart). Block 400: Historical Feature Vector Assembly. Block 410: Bayesian Structural-Time-Series Training. Block 420: execution of ≥10000 Monte-Carlo Simulations (Latin-Hyper-Cube sampling). Block 430: derivation of a Probability Density Function of future CIS values at horizon H. Block 440: calculation of an Impact- Predictability Index (IPI). Iterative loop 450 shows continuous-learning updates conditioned on drift detection.
Figure 10:
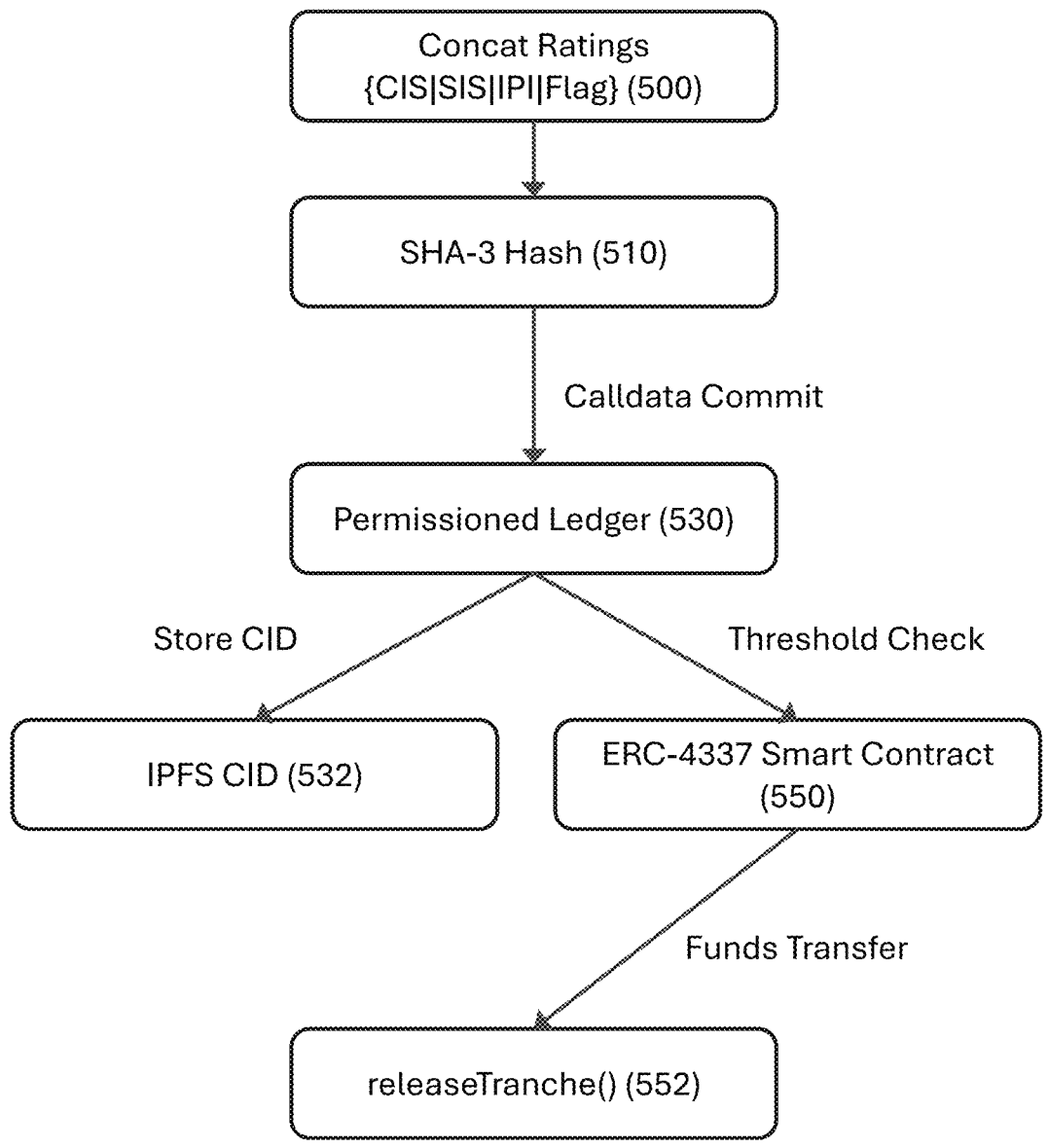
FIG. 10 is a flow chart of a Ledger Commit & Smart-Contract Tranche Release (timing diagram). Stage 500: concatenation of {CIS‖SIS‖IPI‖ZKP-Flag} followed by SHA-3 Hashing (510). Stage 520: Calldata Commit to a Permissioned Distributed Ledger (530) with an associated IPFS CID (532). Stage 540: the ERC-4337 Smart Contract (550) evaluates rating thresholds and, when satisfied, executes releaseTranche( ) (552) to transfer donor funds to the NPO's wallet.

A company or a foundation makes a matching gift in FIG. 4 or a grant donation in FIG. 5 to a charity. An artificial intelligence (AI) model is built to take into account multiple factors that are important to donors. The factors include organization Compliance with Governmental Procedures (i.e. appropriate IRS filing); no criminal records or watch alerts; financials available and healthy based on different factors; no negative news and publicities; strong leadership team; positive public, donors, and volunteer feedback; discrimination policies; and impact from the donations. Additional factors that are relevant to the company or foundation in the community (i.e. Goodwill and public relations). The charity model is incorporated into the AI Engine. The company's historical data is run (in conjunction with charity historical data) through the charity model to train it. The AI engine is then used to Score the company's historical giving data based on the various factors from above. The AI engine will continue to be retrained with new data input to improve it's scoring mechanism to provide a more accurate Score on each charity/organization.

When a company or foundation wishes to donate to a charity, they are able to set their search criteria in the gift system to choose the type of organization they wish to support, or pick an organization that is near and dear to them. Once selected, the AI engine, would provide the Score to the list of organizations that match the donors criteria. The donor may opt to continue and donate to the charity that meets their criteria. For each new decision, the AI engine learns more on the decision-making process and retrains the charity model for the company to improve future scoring.

When the company or foundation is ready to review employee matching gift requests, the AI Engine will provide a score on all the matching gifts in their queue. The matching gift administrator (MGA) can manually approve each request, or auto approve in block 402 of FIG. 4, or block 502 of FIG. 5 as long as all the requests meet the company pre-set threshold. The MG administrator can also review other request with a lower score, and make a manual decision to approve or decline. For each new decision, the AI engine learns more on the decision-making process and retrains the charity model for the company to improve future scoring. For the group of donations completed, the AI engine will batch the donations into one batch, and provide the company MG administrator with the total Batch Funding Amount to pay in order for the donations to be remitted to the charities. The MG administrator can remit the funds via various methods including direct deposit, credit cards, etc. The funding will include the Batch ID to track the donations back to the linked charities receiving the donation.

When the funds are deposited into a Company Escrow Account, the funds will then be made available to recipient charities and a notification is then sent to the charities. Charities can opt to have those funds directly deposited into the account on file, or to withdraw the funds as needed into their preferred banking institution. This eliminates the need for charities to maintain banking information with multiple companies and donors and raise the risk of fraud and bank account hacking. The charity will provide impact information to the AI Engine in order to withdraw or access their funds. This helps the AI Engine learn how the funds are being utilized and to improve donor confidence in the impact of their donations.

Optionally, charities may request to have their professional invoices paid directly from their Funding Account to provide greater transparency into their spending. The charities may benefit from a volume discount program as all charities pool all their purchasing power into one system. Other AI Technologies could be incorporated into the AI engine to enhance the scoring and decision-making process to maximize the impact of the donations and minimize of fraud, non-compliance, and the risk of negative public relations.

AI can also be used to evaluate charities through text analysis, predictive modeling, sentiment analysis, financial analysis, and image and video analysis. Using text analysis, AI can be used to analyze large volumes of text, such as charity reports, to identify patterns and trends. This information can be used to assess the performance and impact of charities. Using predictive modeling, AI can be used to build predictive models that can help identify charities that are likely to be effective, based on historical data and other relevant factors.

Using the sentiment analysis, AI can be used to analyze social media, news articles, and other sources of information to determine the public perception of a charity. This can be useful for evaluating the reputation and credibility of charities. Using financial analysis, AI can be used to analyze financial data, such as budgets and spending, to assess the efficiency and effectiveness of charities. Using image and video analysis, AI can be used to analyze images and videos to assess the impact of charities on communities and beneficiaries.

Charity can be a charity or an organization.

Unless otherwise indicated, the term "charity" or "non-profit organization" (NPO) encompasses any tax-exempt or mission-oriented entity that solicits or receives donations.

1. Low-Latency Data-Ingestion Interface (110) A gRPC or REST interface ingests heterogeneous data streams including: (i) program telemetry, (ii) governance filings, (iii) unstructured multimedia (images, audio, video), and (iv) a machine-readable strategic "Theory of Change" (ToC). Typical latency is ≤50 ms, enabling near-real-time scoring.

2. Secure-Attestation Layer (120) A dedicated ZKP co-processor implements a Groth-16 verifier in hardware. Nonprofits create proof statements attesting to private metrics (e.g., beneficiary counts) without revealing raw data. The verifier returns a Boolean validity flag within ≤6 ms and writes results to a shared DMA buffer accessible by the GPU cluster.

3. Impact-Verification Engine (130) 3.1 Causal-Graph Module (132) constructs directed-acyclic graphs linking interventions to outcomes and executes an O(log n) causal forest to compute a present-day causal-impact score (CIS). 3.2 Neuro-Symbolic Consistency Module (134) parses the ToC into symbolic predicates, embeds incoming evidence via a transformer fine-tuned on sector-specific corpora, and performs logical entailment to generate a strategic-integrity score (SIS). 3.3 Model-Drift Monitor (136) computes a population-stability index every N records; if drift>threshold, it triggers online retraining.

4. Impact-Predictability Engine (140) A Bayesian structural-time-series model conditions on rolling CIS/SIS values, macro-covariates, and proposed donation amount d. ≥10000 Monte-Carlo simulations (Latin-Hyper-Cube sampling) produce a probability density of future causal-impact scores at horizon H, from which an IPI is calculated.

5. Continuous-Learning Optimizer (150) The optimiser ingests streaming labels or pseudo-labels, performing incremental gradient updates without service interruption. In federated deployments, a FedAvg protocol aggregates updates from ≥10 nonprofit nodes while enforcing differential-privacy budgets (ε≤1.0).

6. Rating-Ledger Module (160) The concatenation {CIS-||SIS||IPI||ZKP-flag} is hashed (SHA-3) and written as calldata to a permissioned, append-only distributed ledger (e.g., Hyperledger Fabric). The commit also stores an IPFS CID referencing human-readable JSON-LD provenance and a fan-chart visualisation seed.

7. Automated Fund-Disbursement Interface (170) An ERC-4337 smart contract holds donor funds and exposes releaseTranche ( . . . ) functions. Funds are released proportionally when on-chain CIS/SIS/forecast values satisfy donor-defined thresholds.

8. Affective-Computing Subsystem (180) A multimodal sentiment model scores authenticity of the organization's public multimedia communications. The score is linked to ledger commits to aid reputation assessment.

9. Financial-Resilience Engine (190) An LSTM network predicts three-year liquidity ratios, appended to ledger records to support long-term sustainability evaluation.

Example Use Case

A donor pledges $1,000,000 contingent upon CIS≥0.45, SIS≥0.6, and the 75th-percentile forecasted CIS at horizon 12 months≥0.5. The system computes present scores, forecasts the distribution, hashes results, and writes them to the ledger. The smart contract releases an initial 20% tranche automatically; subsequent tranches execute when updated ratings meet milestones.

I claim:

1. A computer system for cryptographically attested, continuously self-learning, predictive impact-rating of a non-profit organization, the system comprising:

a) a low-latency data-ingestion interface configured to stream heterogeneous data selected from program telemetry, governance filings, unstructured multimedia, and a declared strategic "Theory of Change" (ToC);

b) a secure-attestation layer including a zero-knowledge-proof (ZKP) co-processor that implements a Groth-16 verifier in hardware and returns, within ≤6 milliseconds, a Boolean validity flag for each claim about private operational data;

c) an Impact-Verification Engine executed on at least one GPU-equipped server node, the engine comprising: i. a differentiable causal-graph module that, for each intervention record, executes an O(log n) causal forest to simulate a counterfactual outcome and compute a present-day causal-impact score (CIS);

ii. a neuro-symbolic consistency module that (1) parses the ToC into a directed-acyclic symbolic graph of causal premises, (2) retrieves evidence embeddings via a transformer neural network fine-tuned on sector-specific corpora, and (3) performs continuous logical entailment to compute a strategic-integrity score (SIS);

iii. a model-drift monitor that detects covariate shift by computing a population-stability index on incoming features and, when a threshold is exceeded, triggers online re-training of modules (i) and (ii);

iv. an Impact-Predictability Engine that (1) trains a Bayesian structural-time-series forecaster on rolling CIS values, SIS values, macro-economic covariates, and a proposed donation amount d;

(2) executes ≥10 000 Monte-Carlo simulations to obtain a probability density of future causal-impact scores at horizon H; and (3) derives an Impact-Predictability Index (IPI) equal to the reciprocal of the forecast's coefficient of variation;

v. a Continuous-Learning Optimizer that ingests streaming labeled or pseudo-labeled data comprising newly observed intervention outcomes and evidence updates, and that applies incremental gradient or rule-update steps in near-real-time to the causal-graph module, neuro-symbolic consistency module, and Impact-Predictability Engine without pausing system service, thereby maintaining model performance between full retraining cycles;

d) a rating-ledger module that concatenates {CIS∥SIS∥IPI∥ZKP-flag}, hashes the concatenation with SHA-3, and commits the hash as calldata to a permissioned, append-only distributed ledger, thereby rendering each rating tamper-evident; and e) an automated fund-disbursement interface that emits an ERC-4337 smart-contract call to transfer donor funds only when the ledger-committed CIS and SIS satisfy donor-programmable thresholds and a forecasted percentile-ranked CIS_H derived from the IPI meets or exceeds a target value.

2. The system of claim 1, wherein the ZKP co-processor communicates with the GPU via a PCIe 5.0 bus and shares a direct-memory-access buffer to eliminate serialization overhead.

3. The system of claim 1, wherein the Impact-Predictability Engine employs a temporal graph neural network that updates node embeddings with each incoming donation event.

4. The system of claim 1, wherein the Monte-Carlo simulations use Latin-Hyper-Cube sampling, reducing forecast variance by at least 40 percent relative to naïve sampling.

5. The system of claim 1, wherein the rating-ledger module appends, for every forecast, the SHA-3 hash of the full simulation seed to enable third-party deterministic replay.

6. The system of claim 1, further comprising a financial-resilience engine that predicts a three-year liquidity ratio using an LSTM model fed with macro-economic indicators, the prediction being included in the ledger record.

7. The system of claim 1, further comprising an affective-computing subsystem that assigns an authenticity score to the organization's multimedia communications via multimodal sentiment analysis, the score being stored off-chain but cryptographically linked to the ledger hash.

8. The system of claim 1, wherein the neuro-symbolic consistency module generates an alert when more than five percent of ToC premises are contradicted by incoming evidence within a sliding 30-day window.

9. The system of claim 1, wherein each ledger commit also stores an IPFS content identifier pointing to a human-readable JSON-LD provenance file.

10. The system of claim 1, wherein the automated fund-disbursement interface releases funds in proportional tranches by invoking a smart-contract function releaseTranche(uint256 trancheId, bytes32 ratingHash) tied to successive CIS_H milestones.

11. The system of claim 1, wherein the Continuous-Learning Optimizer performs federated averaging across at least ten geographically distributed nonprofit nodes, updating global model parameters while keeping raw data local.

12. The system of claim 1, wherein the Continuous-Learning Optimizer enforces differential-privacy noise budgets on its gradient updates to protect sensitive beneficiary information.

13. The system of claim 1, wherein the Continuous-Learning Optimizer incorporates an on-policy reinforcement-learning loop that adjusts recommended donation tranche sizes to maximize a reward function based on predicted future CIS_H.

14. A computer-implemented method for present-day and predictive impact-rating of a non-profit organization with continuous self-learning, the method comprising: a) streaming, via a low-latency interface, heterogeneous data including a strategic ToC, public records, and private operational metrics accompanied by a ZKP; b) verifying the ZKP with a Groth-16 hardware verifier to produce a validity flag within ≤6 milliseconds; c) executing, on a GPU tensor core, a differentiable causal forest to simulate a counterfactual outcome and compute a CIS; d) translating the ToC into symbolic predicates, retrieving evidence embeddings with a transformer network, performing entailment checking, and computing a SIS; e) forecasting future impact by: i. training a Bayesian structural-time-series model with historical CIS, SIS, macro-features, and a proposed donation amount; ii. running ≥10 000 Monte-Carlo simulations to generate a probability density of future CIS values at horizon H; iii. deriving an IPI from the probability density; f) applying continuous-learning updates by ingesting streaming outcome labels and evidence, computing incremental parameter-update vectors, and updating the causal-graph module, neuro-symbolic consistency module, and Impact-Predictability Engine without interrupting system availability; g) concatenating {CIS∥SIS∥IPI∥validity-flag}, hashing the concatenation with SHA-3, and committing the hash to a permissioned ledger; and h) triggering a smart-contract disbursement of donor funds when CIS, SIS, and a percentile-ranked CIS_H derived from step (e) meet or exceed donor-defined thresholds.

15. The method of claim 14, further comprising detecting feature-distribution drift by computing a population-stability index every 10000 records and initiating federated re-training upon detecting drift beyond a predefined threshold.

16. The method of claim 14, wherein step (e) dynamically allocates simulation budget using Thompson Sampling to minimize forecast variance subject to a fixed compute budget.

17. The method of claim 14, further comprising computing an Impact-at-Risk (IaR) metric analogous to financial Value-at-Risk and including the IaR in the ledger provenance file.

18. The method of claim 14, wherein the ledger hash produced in step (g) references a fan-chart visualization of the forecast distribution, the visualization being reproducible from the stored simulation seed.

19. The method of claim 14, wherein step (f) performs federated averaging across at least ten nonprofit nodes to update global parameters while preserving local data privacy.

20. The method of claim 14, wherein step (f) adds calibrated Gaussian noise to each gradient update to satisfy a differential-privacy budget ε≤1.0.

* * * * *